(12) United States Patent
Neve et al.

(10) Patent No.: US 6,427,923 B1
(45) Date of Patent: Aug. 6, 2002

(54) HEATING SYSTEM

(75) Inventors: Christian Neve, Lausen (CH); Jørgen Seerup, Mårslet; Eva Kühne, Silkeborg, both of (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/988,074

(22) Filed: Nov. 16, 2001

(30) Foreign Application Priority Data

Nov. 18, 2000 (DE) .......................... 100 57 358

(51) Int. Cl.[7] .............................................. G05D 23/00
(52) U.S. Cl. .......................... 237/2 A; 237/8 A; 237/69
(58) Field of Search .................. 237/69, 2 A, 8 R, 237/8 A, 12.3 B, 43; 165/56, 49, 171; 454/185

(56) References Cited

U.S. PATENT DOCUMENTS 4,653,729 A * 3/1987 Ando .......................... 165/42

* cited by examiner

Primary Examiner—Harold Joyce
Assistant Examiner—Derek S. Boles
(74) Attorney, Agent, or Firm—Burns, Doane, Swecker & Mathis, L.L.P.

(57) ABSTRACT

A heating system having, in at least one heatable room, at least one first heating device and a second heating device, with the second heating device being of a kind which differs from that of the first heating device, and with both heating devices being controlled. To improve the comfort feeling of a consumer, the two heating devices and their control circuits are coupled with each other, and a change of a parameter in one control circuit causes a corresponding change of a parameter in the other control circuit.

18 Claims, 1 Drawing Sheet

HEATING SYSTEM

FIELD OF THE INVENTION

Figure 1:
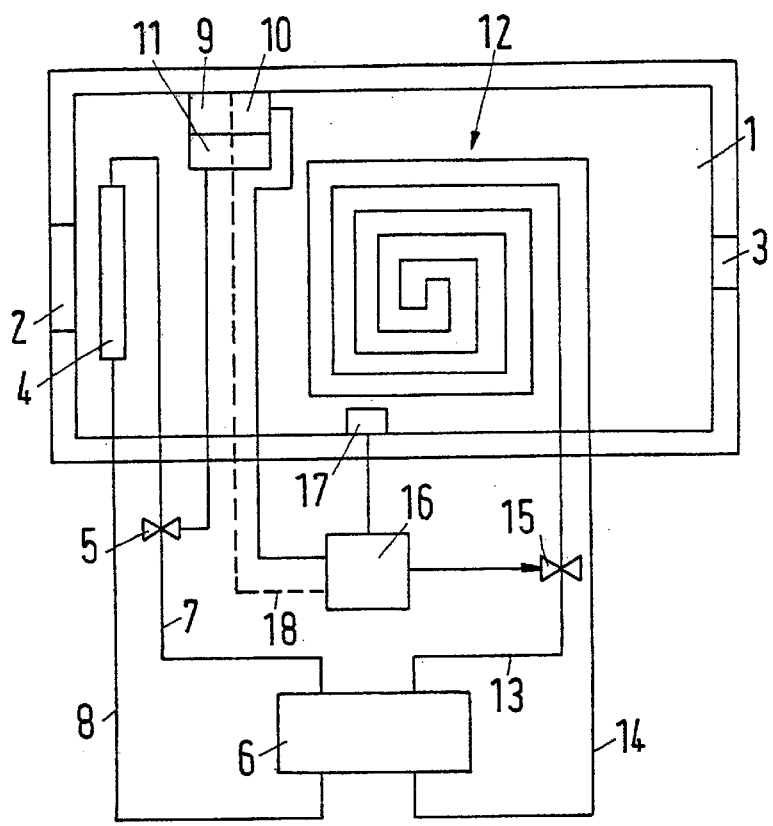

The invention relates to a heating system, having, in at least one heatable room, at least one first heating device and a second heating device, the kind of which differs from that of the first heating device, both heating devices being controlled.

BACKGROUND OF THE INVENTION

A heating system of this kind is known from DE 31 13 285 A1. This heating system has a basic heating system in the form of floor heating systems, and an additional heating system in the form of fresh-air heating. The floor heating, which is also operated by means of heated air, provides a basic heating of the room or the rooms, whereas faster temperature changes can be effected by means of the hot-air heating, for example when the number of persons staying in a room changes. When it is established that the additional heating system supplies its full output, the basic heating system is run to a higher temperature. Vice versa, the temperature of the basic heating system is reduced, when for a certain period the hot-air heating has supplied no heat. In this connection, the basic heating system can also be controlled in dependence of the outdoor temperature.

Based on the heat supplied by the floor heating, a heating system of this kind is able to make up for temperature changes by means of the additional heating system. However, a heating system of this kind affects the comfort feeling of a person, who stays in a room heated in this way.

The invention is based on the task of increasing the comfort feeling of a person.

SUMMARY OF THE INVENTION

In a heating system as mentioned in the introduction, this task is solved in that both heating systems, including their control circuits, are coupled with each other, and a change of a parameter in one control circuit causes a corresponding change of a parameter in the other control circuit.

Thus, the two heating devices no longer work separately from each other or after each other, but work as a united heating system. In a manner of speaking, the heating device is no longer driven to the limit, after which the other heating device is made to follow, but it is always ensured that a certain accordance or synchronisation occurs between the two heating devices. As the two heating devices differ from each other in kind, for example certain thermal inertias or delays may occur, so that it can still be ensured that one heating device assumes the basic load, whereas the other heating device settles the peak values. However, for example, no heavy spreads or distances occur between the heat amounts supplied by one or the other heating device, meaning that the person or consumer staying in the room feels exposed to a pleasant heating atmosphere.

Preferably, the parameter is a desired value. The desired value can for example be a desired temperature value. A parameter of this kind can easily be changed by the consumer, for example by turning the handle of a radiator thermostat to set a higher or lower temperature. When the desired value of one control circuit is changed, this leads to a change in the other control circuit, however, a change of a desired temperature value is not necessarily required. A corresponding size, for example a desired flow rate value or the like, can be specified.

Preferably, the second heating device is made to be more inert than the first heating device, and the parameter in the second heating device follows that in the first heating device. Thus, the nimbler or faster heating device assumes the leading role; which means that the consumer very soon gets the feeling that a change of, for example, the desired temperature value or the heat irradiation from the outside, makes a difference. A change also appears in the control circuit of the second heating device. As, however, this heating device cannot react so fast, it takes longer, before the effects will appear in the room.

Preferably, a fixed correlation exists between the parameters of the two control circuits. When, for example, a desired temperature value is used as parameter in the control circuit of the first heating device, it can be ensured that also in the control circuit of the second heating device a desired temperature value is specified, which is then, however, for example, 2° C. lower. The second heating device then provides the heat quantity, which would be required to heat the room to the reduced temperature, whereas the first heating device supplies the remaining heat quantity. As the first heating device reacts substantially faster, it can react much faster to temperature changes, for example an increased sun irradiation or the opening of a window.

Preferably, the first control circuit controls a room temperature. This is usually the decisive size for the comfort feeling of the consumer. The consumer sets a room temperature of, for example, 20° C. or 22° C. and expects this temperature to be reached as fast as possible. This is possible without problems with the faster first control circuit.

Preferably, the second control circuit controls a heat amount. For each desired room temperature; the second control circuit "knows", which heat amount is required to reach this room temperature at least approximately. A difference to this desired room temperature, however, has to exist, so that the first heating device still has the opportunity to balance temperature changes. Thus, there is an immediate correlation between the pre-selected room temperature, which can be controlled relatively exactly by the first control circuit and the heat amount controlled by the second control circuit.

Alternatively, the second control circuit can control a heating device temperature or a difference between the heating device temperature and the room temperature. In the first case, it is assumed that the heating device temperature must always be, for example, 2° C. or 4° C. below the pre-specified desired temperature value. In the second case, it is assumed that the heating device temperature must always be lower than the actual room temperature by a predetermined temperature difference. In both cases, the second heating device follows the first heating device with regard to heat supply.

Preferably, the first heating device is a radiator, and the second heating device is a floor heating, a ceiling heating or a wall heating. The second heating device is thus a surface heating system, which can supply corresponding heat amounts at relatively low temperatures, as this temperature acts over a relatively large surface. The disadvantage of such a system is that the temperature change is effected relatively slowly, as also the surface, for example the floor, must change its temperature. The first heating device, however, is a radiator Particularly the modern plate radiators can follow temperature changes relatively quickly.

Preferably, both control circuits are provided with a common thermostatic device. The consumer thus sets the desired temperature by means of the thermostatic device. The thermostatic device then throttles the supply of a heat carrying medium to the first heating device and also the supply of the heat carrying medium to the second heating device, the throttling to the second heating device basically taking place in such a way that the pre-selected desired temperature value cannot be reached by means of the second heating device alone.

In an alternative embodiment, each control circuit has its own thermostatic device, and at least one control device is provided, which evaluates the information supplied by the two thermostatic devices. In a manner of speaking, each of the two thermostatic devices continuously has updated information about the other thermostatic device, meaning that particularly the control circuit of the second heating device can follow the specifications from the control circuit of the first heating device.

It is also preferred that the second heating device has an adaptable control device that changes the parameters of the second heating device on the basis of a heating course of the first heating device. This means that when the first heating device heats in accordance with a predetermined pattern, the heat supply through the other heating device is maintained. When, however, the first heating device heats in accordance with a different pattern, the temperature of the second heating device is increased or reduced, depending on the result found by the adaptable control device. The adaptation occurs in that the control device feels, if the influences of the second heating device have led to the desired result or not.

BRIEF DESCRIPTION OF THE DRAWING FIGURES

In the following, the invention is described in detail on the basis of preferred embodiments in connection with the drawings, showing:

FIG. 1 a first embodiment of a heating system.

Figure 2:
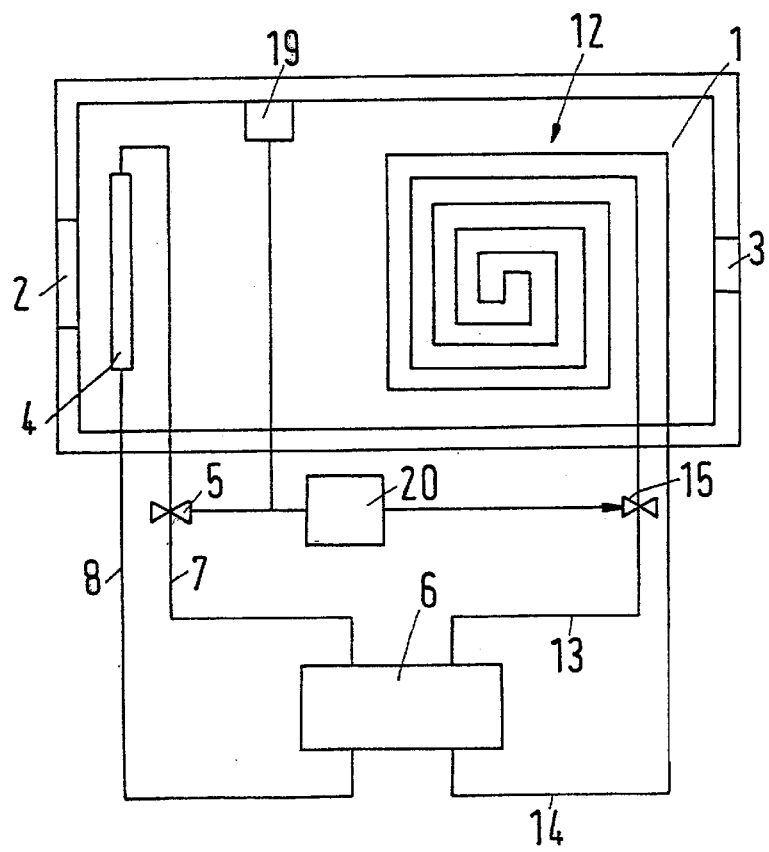

FIG. 2 a second embodiment of a heating system.

DETAILED DESCRIPTION OF THE INVENTION

FIG. 1 shows a room 1 with a window 2 and a door 3. Under the window is arranged a radiator 4, which is supplied with heating fluid, for example hot water, from a heat source 6, which is only shown schematically. For this purpose, a flow line 7 and a return line 8 are provided between the radiator 4 and the heat source 6. In the flow line 7 is arranged a valve 5, which is in the form of a thermostatic valve. The thermostatic valve 5 is usually placed in the room 1, normally immediately next to the radiator 4. For the purpose of simplifying the explanation, it is placed outside the room 1.

The valve 5 is controlled by a thermostatic element that has a temperature sensor 9, a reference value transmitter 10 and a controller 11, which generates an adjustment signal for the valve 5 by means of a difference between desired value and actual value.

The radiator 4 forms a first heating device, which is controlled by a first control circuit with the temperature sensor 9, the reference value transmitter 10 and the controller 11. The radiator 4 can respond relatively fast to temperature changes.

In the room 1, a further, second heating device is arranged in the form of a floor heating 12. The floor heating 12 is supplied with water from the heat source 6 via a flow line 13 and returns the heating fluid to the heat source 6 via a return line 14. In the flow line 13 is arranged a valve 15 that controls the flow of heating fluid through the floor heating 12. The valve 15 is connected with a controller 16, which supplies the corresponding adjustment signals. The controller 16 is again connected with a temperature sensor 17, which, for example, senses the temperature of the floor, in which the floor heating 12 is arranged.

The second heating device can also be a different kind of surface heating, for example a wall or a ceiling heating. Such surface heating systems are relatively slow or inert, that is, when a change of an external size, like outdoor temperature or desired value has occurred, it takes longer, till the floor heating has brought the room back to the desired temperature.

The controller 16 also receives the desired value from the reference value transmitter 10. Under certain circumstances, also the actual temperature from the temperature sensor 9 can be supplied to the controller 16, as shown by means of the dotted signal line 18.

From this embodiment it can be seen that the first heating device 4 and the second heating device 12 work together in such a way that they act as one single heating system. However, differences occur because of the differing thermal inertias of the two heating devices 4, 12. Differences also occur in that a setpoint of the second heating device 12 differs from the setpoint of the first heating device 4. The two setpoints can, for example, be desired values. For the first heating device 4, for example, a desired temperature value can be specified as desired value by means of the reference value transmitter 10. In other words, the radiator 4 must ensure that the temperature in the room 1 is brought to the set temperature. However, it does not have to provide the whole heat output on its own, as the setpoint of the floor heating 12 is selected in dependence of the setpoint of the radiator 4, in such a way that the floor heating 12 supplies a heat amount contribution, which is sufficient to bring the room to a temperature, which is lower than the set desired temperature value by a temperature difference, for example 2° C. This can, for example, be achieved in that the temperature of the floor is measured by means of the temperature sensor 17, or the temperature difference between the temperature of the floor and the room temperature, which is sensed by the temperature sensor 9. The temperature difference can also be larger, for example it can amount to 4° C.

When, for example, a room temperature of 22° C. is desired, the floor heating 12 will supply heat, which would be sufficient to heat the room to 20° C. The 20° C. are called "setpoint". Additionally, the floor heating ensures that the basic temperature of 20° C. is maintained. The radiator 4, on the other hand, supplies the heat amount, which is required to add a temperature increase by the remaining 2° C. As the radiator 4 can respond substantially faster to changes in the room temperature, which are, for example, caused by an increased or decreased sun irradiation, it is able to maintain the temperature of the room relatively exactly at the specified desired temperature value in the band width of these 2° C.

When the consumer, who wishes to stay in the room, changes the desired temperature value, for example to 20° C., the setpoint of the floor heating 12 is automatically reduced via the controller 16, for example to 18° C.

The control circuit of the second heating device, namely the floor heating 12, also follows the setpoint of the first heating device, namely the radiator 4.

Via the controller 16, the second heating device, namely the floor heating 12, always has the required information about the first heating device, namely the radiator 4, so that here a clearly defined dependency exists.

In the embodiment according to FIG. 1, two thermostats are provided.

FIG. 2 shows an embodiment, in which only one thermostatic element 19 is provided. The remaining elements, which correspond to those in FIG. 1, have the same reference numbers.

The thermostatic element 19, which comprises a desired value specification, a temperature sensor and a controller, is, like also in FIG. 1, directly connected with the valve 5. Additionally, it is connected with the valve 15 via a control device 20, which ensures that in connection with the setting of the valve 15 a certain value is always added or subtracted, depending on whether the valve 15 opens or closes when activated. Thus, it is ensured that the floor heating 12 can be operated in dependence of the room temperature, however, in such a way that the set desired value can basically not be reached, when the floor heating 12 would provide the heating by itself. The remaining temperature difference is then supplied by the radiator 4, which can guarantee a shorter adaptation time of the temperature due to its faster thermal response.

In both embodiments it can be ensured that the controller 16 or the control device 20 is made to be self-learning. The floor heating 12 is relatively inert, so that in many cases it makes no sense to balance any temperature change immediately through the floor heating. The controller 16 or the control device 20 therefore observes the course of the control of the radiator 4 by the valve 5. When the controller 16 or the control device 20 establishes that here a durable, increased heat requirement manifests itself, that is, establishes that during a predetermined period the valve 5 permits more heating fluid to flow through than during a previous period, an increased amount of heating fluid is supplied to the floor heating 12. When, on the other hand, the controller 16 or the control device 20 establishes that the heat requirement of the radiator 4 is reduced, and the valve 5 is closed to a higher degree and more often, the floor heating 12 is accordingly supplied with a smaller amount of heating fluid.

In any case, however, it is ensured that also the floor heating is operated in such a way, that it is adapted to the actual heat requirement, also when, due to the thermal inertia, this heat requirement is detected over a longer period.

By means of the temperature sensor 17, it can also be effected that the floor heating 12 supplies no heat at all, when this is not required, but also that the floor does not cool off, as this would have a negative influence on the comfort experience of a consumer.

A heating system for one room is shown. However, it goes by itself that in a building several rooms or even all rooms can be equipped with a combined heating system of this kind.

The connections between the controller 11 and the controller 16 and between the controllers 11, 16 and the valves 5, 15, respectively, shown in the drawing, can be made as traditional signal lines. However, it is preferred, to make the system as a wireless system, in which the information transmission is wireless, and takes place, for example, by radio. Thus, it is relatively simple to implement the system in an already existing floor heating system.

What is claimed is:

1. Heating system comprising, in at least one heatable room, at least one first heating device and a second heating device, the second heating device being of a kind which differs from the first heating device, both heating devices being controlled by way of respective control circuits, the at least one first heating device and the second heating device, including their control circuits, being coupled with each other, with a change of a parameter in one control circuit causing a corresponding change of a parameter in the other control circuit, the second heating device having an adaptable control device that changes the parameters of the second heating device on the basis of a heating course of the first heating device.

2. System according to claim 1, wherein the parameter is a desired value.

3. System according to claim 1, wherein the second heating device is more inert than the first heating device, and the parameter in the second heating device follows that in the first heating device.

4. System according to claim 1, wherein a fixed correlation exists between the parameters of the two control circuits.

5. System according to claim 1, wherein the control circuit of the first heating device controls a room temperature.

6. System according to claim 5, wherein the control circuit of the second heating device controls a heat amount.

7. System according to claim 5, wherein the control circuit of the second heating device controls a heating device temperature or a difference between the heating device temperature and the room temperature.

8. System according to claim 1, wherein the first heating device is a radiator, and the second heating device is a floor heating, a ceiling heating or a wall heating.

9. System according to claim 1, wherein both control circuits are provided with a common thermostatic device.

10. System according to claim 1, wherein each control circuit has its own thermostatic device and at least one control device is provided, which evaluates information supplied by the thermostatic devices of the control circuits.

11. Heating system comprising, in at least one heatable room, at least one first heating device and a second heating device, the second heating device being of a kind which differs from the first heating device, both heating devices being controlled by way of respective control circuits, the at least one first heating device and the second heating device, including their control circuits, being coupled with each other, with a change of a parameter in one control circuit causing a corresponding change of a parameter in the other control circuit, each control circuit having its own thermostatic device, and at least one control device which evaluates information supplied by the thermostatic devices of the control circuits.

12. Heating system according to claim 11, wherein the parameter is a desired value.

13. Heating system according to claim 11, wherein the second heating device is more inert than the first heating device, and the parameter in the second heating device follows that in the first heating device.

14. Heating system according to claim 11, wherein a fixed correlation exists between the parameters of the two control circuits.

15. Heating system according to claim 11, wherein the control circuit of the first heating device controls a room temperature.

16. Heating system according to claim 15, wherein the control circuit of the second heating device controls a heat amount.

17. Heating system according to claim 15, wherein the control circuit of the second heating device controls a heating device temperature or a difference between the heating device temperature and the room temperature.

18. Heating system according to claim 11, wherein the first heating device is a radiator, and the second heating device is a floor heating, a ceiling heating or a wall heating.

\* \* \* \* \*